H. O. BROWN & A. H. LOWE.
MOTOR DRIVEN AGRICULTURAL MACHINE.
APPLICATION FILED JAN. 30, 1914.
1,123,086.
Patented Dec. 29, 1914.
2 SHEETS—SHEET 2.
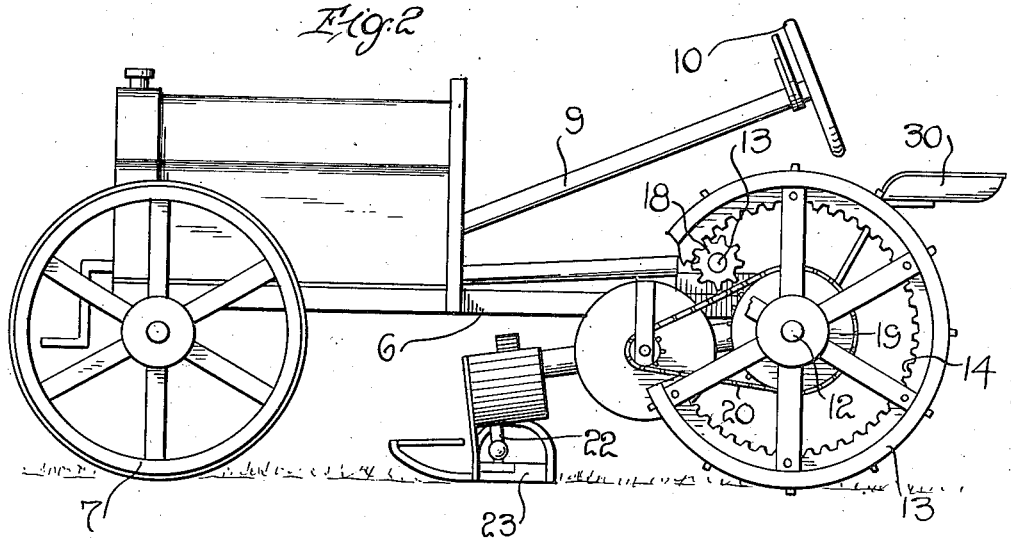
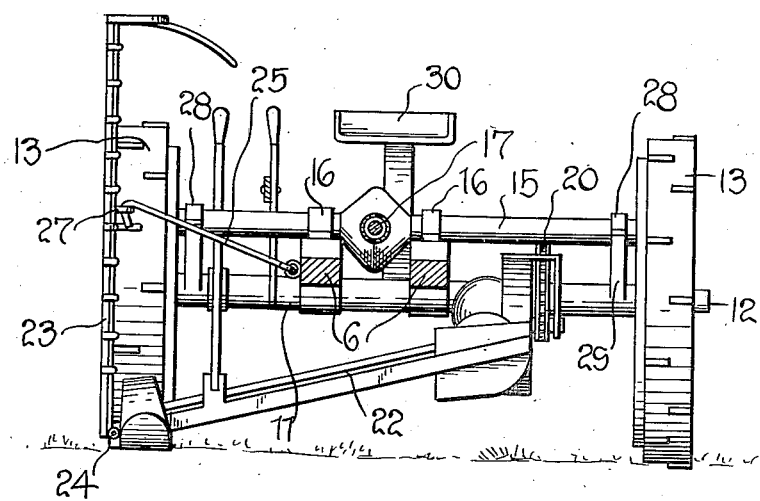
Witnesses
Inventors
H. O. Brown and
A. H. Lowe
By Watson E. Coleman
Attorney

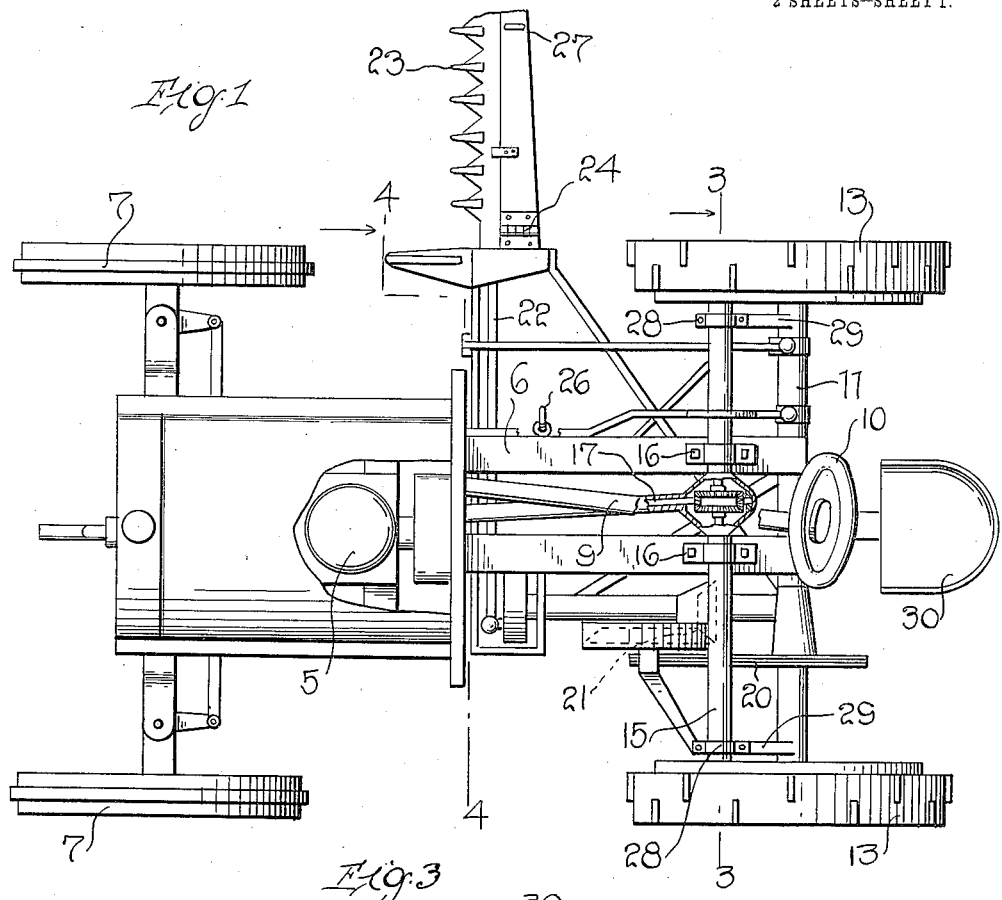
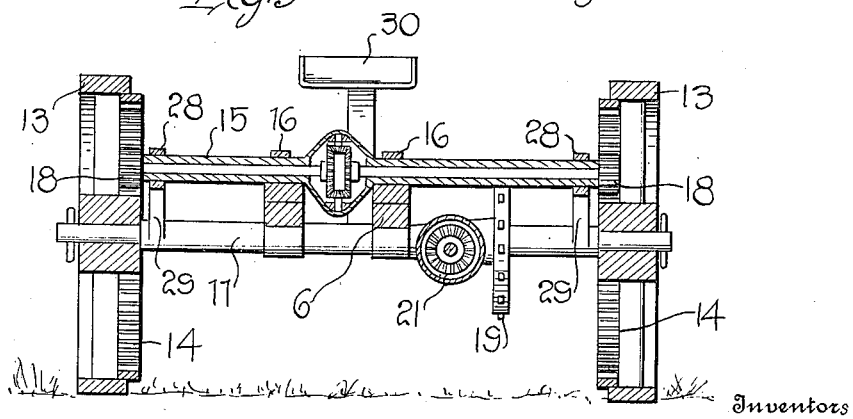

UNITED STATES PATENT OFFICE.

HOWARD O. BROWN AND ARCHIE H. LOWE, OF CUBA, NEW YORK.

MOTOR-DRIVEN AGRICULTURAL MACHINE.

1,123,086. Specification of Letters Patent. Patented Dec. 29, 1914.

Application filed January 30, 1914. Serial No. 815,484.

*To all whom it may concern:*

Be it known that we, HOWARD O. BROWN and ARCHIE H. LOWE, citizens of the United States, residing at Cuba, in the county of Allegany and State of New York, have invented certain new and useful Improvements in Motor-Driven Agricultural Machines, of which the following is a specification, reference being had to the accompanying drawings.

This invention relates to power driven agricultural machines such as mowers, reapers, cultivators and the like, and has for its primary object to provide improved means for transmitting power from the motor or engine to the rear traction wheels of the machine whereby the general durability, serviceability and efficiency of the machine in operation is materially increased.

The invention has for another and more particular object to provide improved means for mounting the power transmission shaft upon the frame of the machine, said shaft being provided at opposite ends with gears or pinions, and internal gears fixed to each of the rear traction wheels for engagement by the respective pinions whereby the power is transmitted and applied directly to said wheels.

The invention has for a further object to improve and simplify the construction of machines of the above character, thereby enabling the same to be produced at a low manufacturing cost.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawings, in which—

Figure 1 is a plan view of a power driver mower embodying our invention in its preferred form throughout this specification. Fig. 2 is a side elevation thereof with one of the drive wheels being broken away. Fig. 3 is a section taken on the line 3—3 of Fig. 1. Fig. 4 is a section taken on the line 4—4 of Fig. 1.

Referring in detail to the drawings, 5 indicates the motor or engine which is mounted the machine frame, said frame including a bed upon which the engine is mounted and secured to the rearwardly extending parallel bars or tongues 6. At its forward end the frame is supported upon a suitable axle on the ends of which the steering wheels 7 are mounted. These wheels may be turned to direct the course of the machine by any approved construction of steering gear, the same including a post indicated at 9 through which the steering shaft extends, said shaft being provided with a suitable hand wheel 10 on its upper end. Upon the rear ends of the parallel tongues 6 of the machine frame a casing 11 for the rear wheel shaft 12 is secured. Fixed and loose traction wheels are mounted upon the opposite ends of this shaft. To the inner sides of the wheel spokes the internal gears 14 are bolted or otherwise securely fixed.

15 indicates the casing of the power transmission shaft which is mounted in suitable boxings 16 secured upon the frame tongues 6. This casing is centrally provided with a suitable housing for the differential gear mechanism which is of any ordinary or usual construction and transmits power to the sections of the power transmission shaft from the engine shaft indicated at 17, at different speeds. The ends of the power transmission shaft are provided with gears or pinions indicated at 18 for engagement with the teeth of the internal gears 14 on the traction wheels 13.

To the rear driving axle 12 of the machine a sprocket wheel 19 is secured with which the sprocket chain 20 is engaged. This sprocket chain drives the gearing indicated by the numeral 21 through the medium of which the pitman rod 22 is actuated. This pitman rod is connected to and operates the cutter bar of a sickle shown at 23. The finger bar of the sickle is hingedly connected as at 24 to the swath board and is adapted to be elevated to a vertical position and held in such position by means of a rod 25, one end of which is loosely attached to one of the tongues 6 and the other end of which is provided with a hook for engagement with a ring or eye 27 secured upon the finger bar.

The casing for the power transmission shaft 16 is braced and supported at its ends by the additional bearings or boxings 28 which are mounted upon the obliquely disposed arms 29 fixed upon the ends of the axle casing 11.

From the above description, taken in connection with the accompanying drawing, it is believed that the construction, manner of operation and several advantages of our invention will be clearly and fully understood.

When the engine 5 is set in operation, power is transmitted through the medium of the pinions 18 which are engaged with the internal gears 14 to the rear traction wheels of the machine so that the same is propelled over the field. As the machine is driven, the cutter bar which is actuated through the gearing and sprocket chains 20 form the rear driven axle of the machine, is being constantly reciprocated so that the hay or other grain standing in the path of movement of the sickle will be cut. In this manner it will be seen that the crop may be easily and quickly harvested with the consumption of minimum power and with but little labor upon the part of the operator. The machine is of course provided with the usual control levers for the engine and the adjusting levers for raising and lowering the sickle. Upon the casing of the driven wheel axle, the driver's seat indicated at 30 is mounted.

A power driven mower or other agricultural machine constructed in the manner above described is extremely strong and durable, as well as highly serviceable and convenient in practical use. The machine may also be manufactured at comparatively small cost and relieves the operator of considerable care and attention required in the operation of the ordinary horse drawn machines of this character.

While we have shown and described the preferred construction and arrangement of the several parts, the invention is susceptible of considerable modification therein, and we therefore reserve the privilege of resorting to all such legitimate changes as may be fairly embodied within the spirit and scope of the invention as claimed.

What is claimed is:

A machine of the character described including a frame forward supporting wheels for the frame, the frame including rearwardly extending parallel tongues, an axle casing mounted upon the rear ends thereof, a rear wheel axle mounted in the casing, fixed and loose traction wheels mounted upon the respective ends of the rear axle and provided with an internal gear, a sprocket wheel fixed to the axle adjacent one end thereof, a second casing mounted upon the frame tongues, a power transmitting shaft mounted in said casing and geared to the motor shaft, gears fixed to the respective ends of the power transmitting shaft adapted to mesh with the internal gears, a horizontally disposed pitman rod, gearing connecting the pitman rod, and a sprocket chain connecting the sprocket wheel and gearing whereupon rotation of the traction wheels the pitman rod will be actuated.

In testimony whereof we hereunto affix our signatures in the presence of two witnesses.

HOWARD O. BROWN.
ARCHIE H. LOWE.

Witnesses:
M. CARLISLE LYDDAUE,
D. W. GALE.